Oct. 30, 1956  J. T. CRONKHITE  2,768,704
APPARATUS FOR FACILITATING FLOW OF LIQUID THROUGH GATHERING
PIPE LINES TO A PUMP SUPPLYING A MAIN PRESSURE LINE
Filed July 20, 1954  3 Sheets-Sheet 2
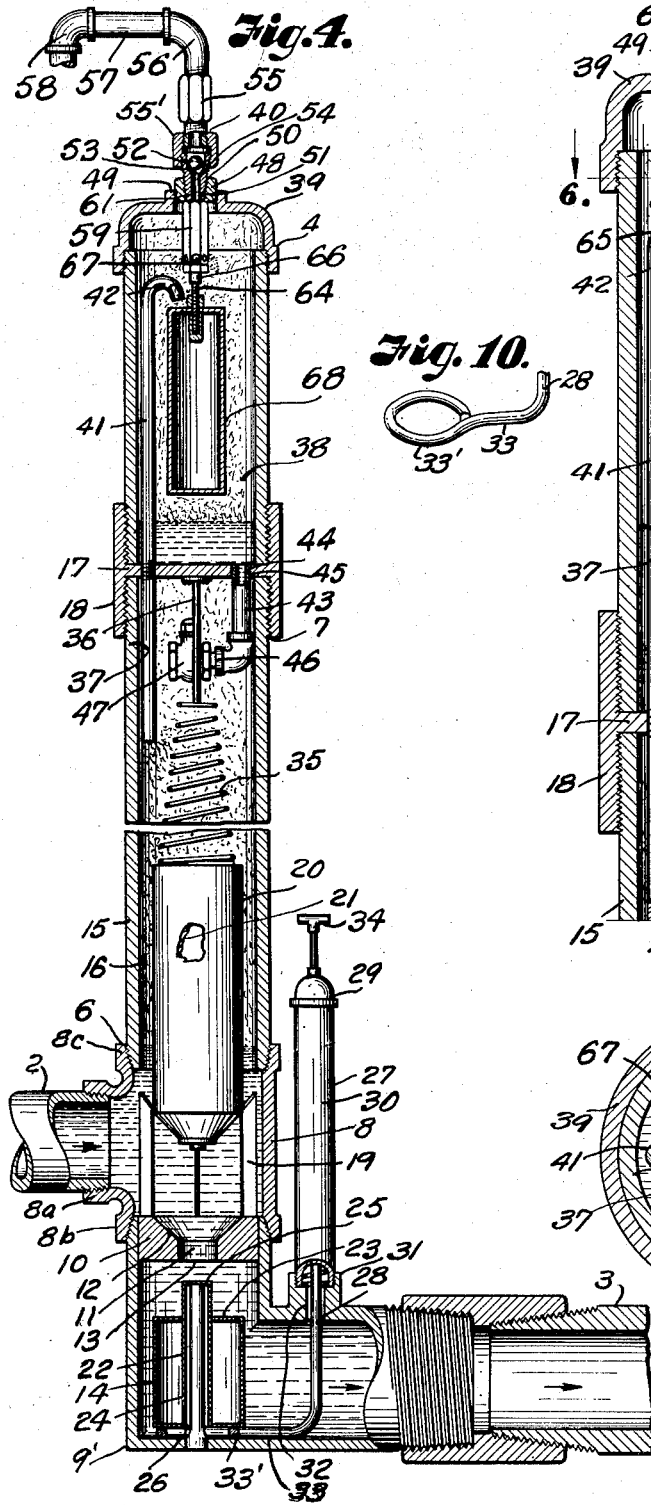
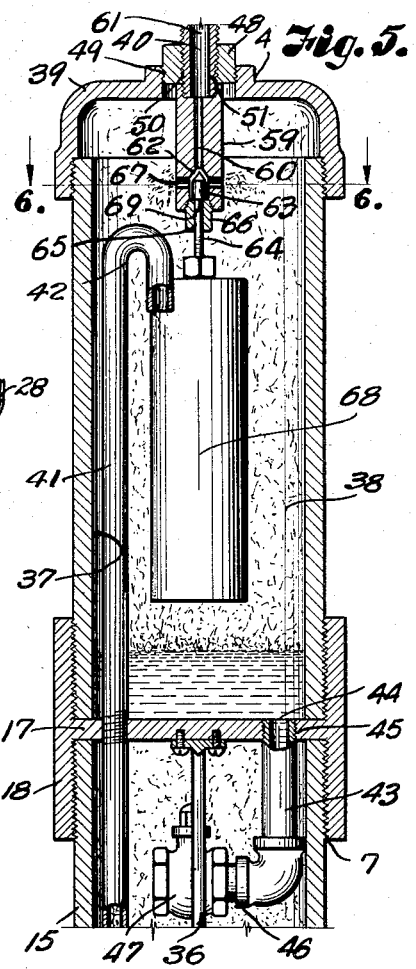
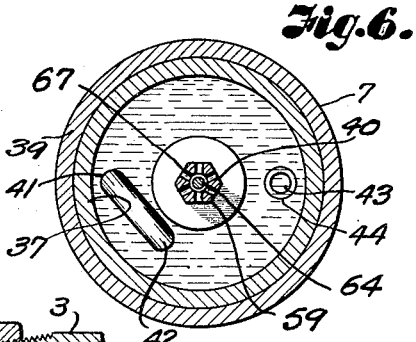
INVENTOR.
John T. Cronkhite.
BY
ATTORNEYS.

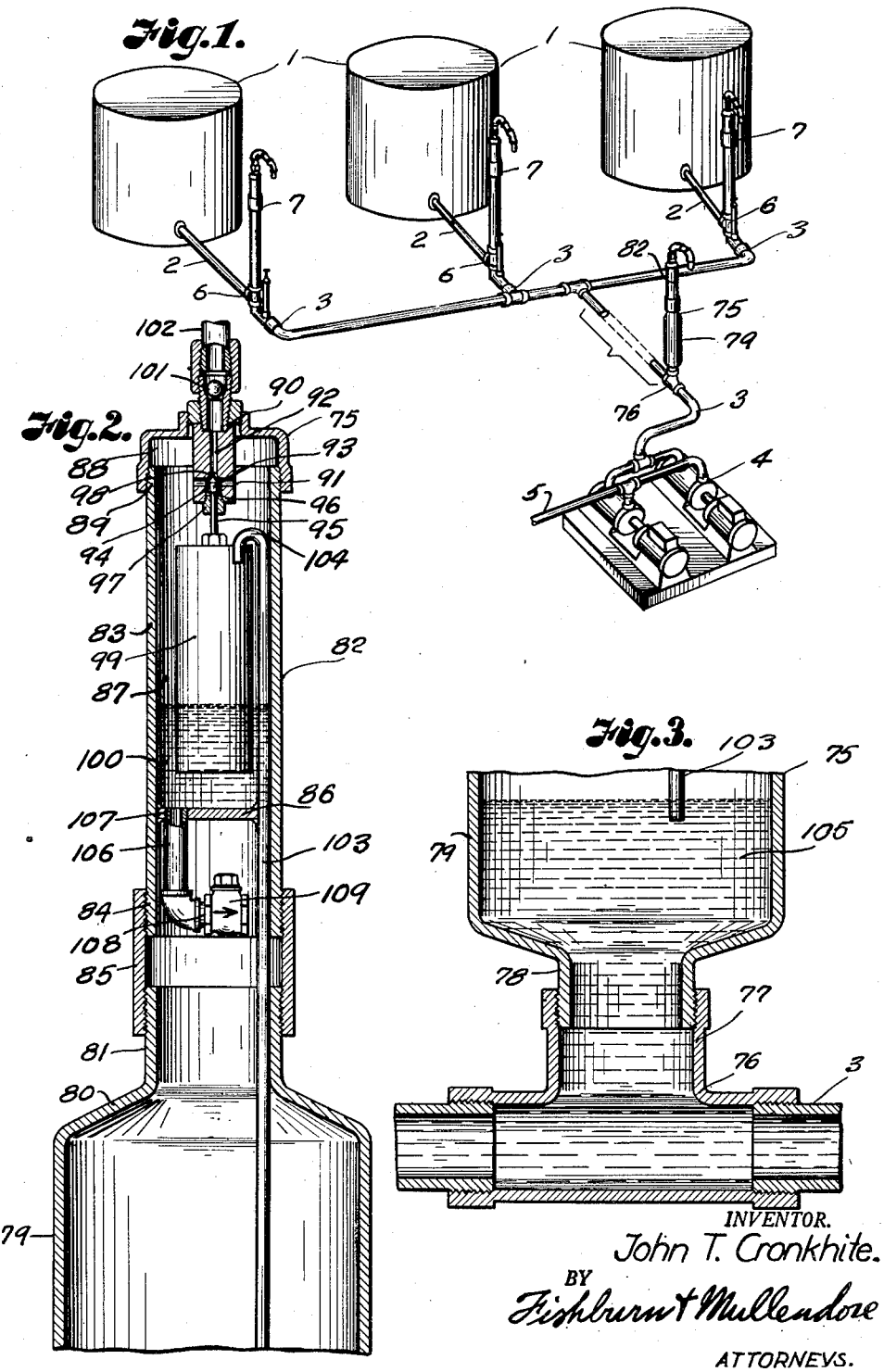

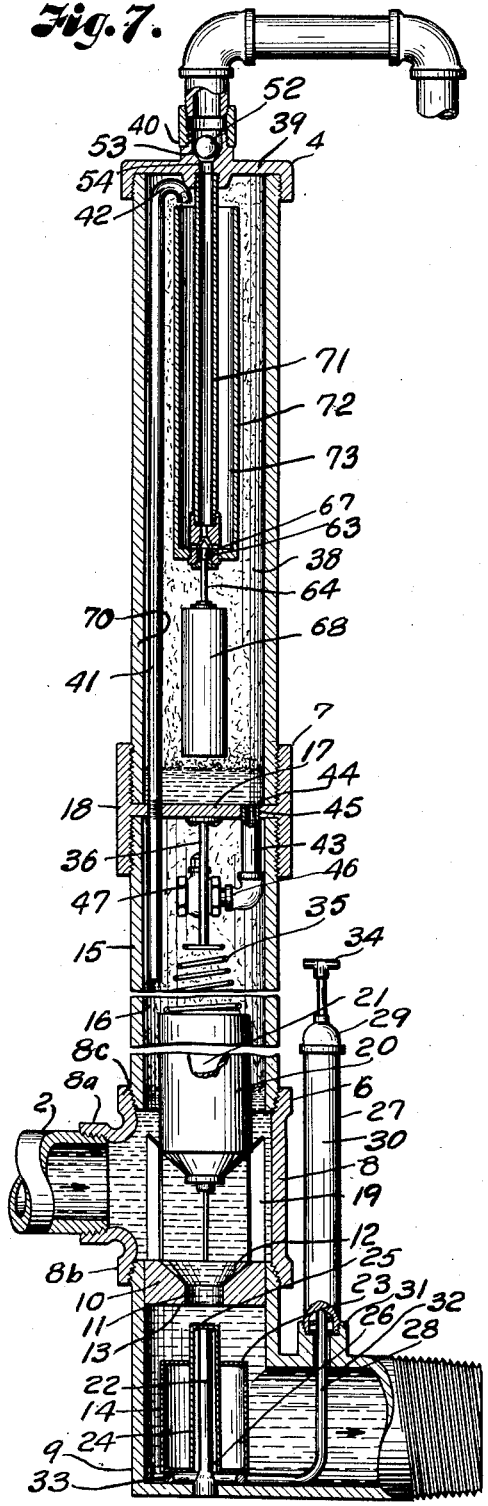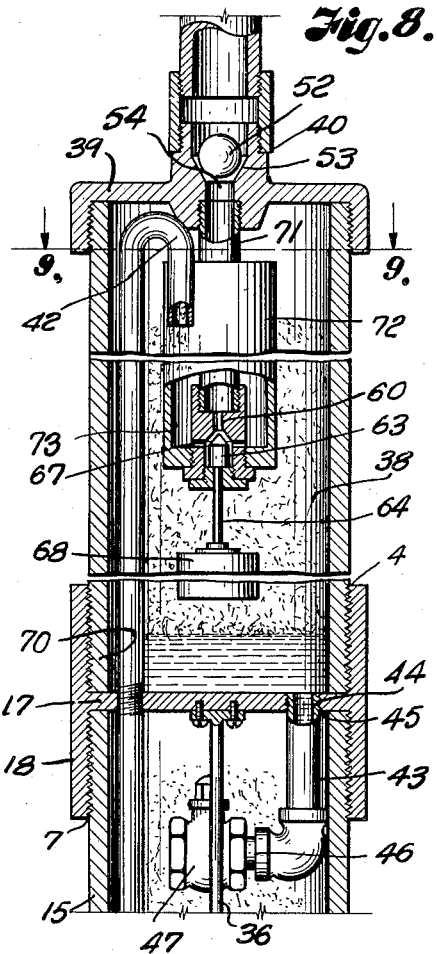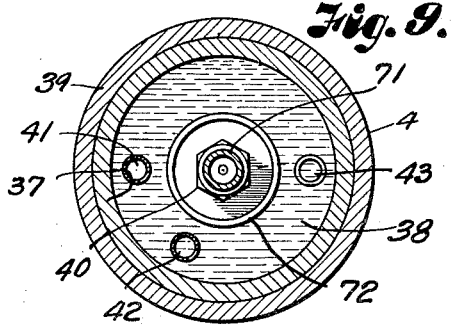
INVENTOR.
John T. Cronkhite.
ATTORNEYS.

United States Patent Office 2,768,704
Patented Oct. 30, 1956

2,768,704

APPARATUS FOR FACILITATING FLOW OF LIQUID THROUGH GATHERING PIPE LINES TO A PUMP SUPPLYING A MAIN PRESSURE LINE

John T. Cronkhite, Tulsa, Okla.

Application July 20, 1954, Serial No. 444,624

5 Claims. (Cl. 183—2.7)

This invention relates to a mechanism for controlling flow of liquid from a storage tank to a system of gathering lines leading to a main pipe line operating under pump pressure and more particularly to apparatus for facilitating flow of the liquid to the pumps in the production of petroleum liquids, the liquids are usually collected in storage or gauge tanks preparatory to sale to the pipe line company. After the liquid petroleum has been gauged and tested, the tank shut off valve is opened into the gathering line to which the tank is connected.

The liquid usually flows in the gathering lines by gravity to the pumps which supply the liquid to the main pipe line under pressure. Consequently, the liquid is in motion toward the pumps when the inlet valves of the pump close on each stroke of the pump piston with the result that the flow is suddenly stopped at the pump and there is a back surge that continues up the lines against the gravity flow of liquid toward the pump. The serious effects produced by the surge builds up with each stroke of the pump to further interfere with flow of liquid to the pump, in fact, surge retards flow about 20 percent before it becomes expended or reaches an inlet to one of the gathering lines or tanks.

It also happens that petroleum liquids usually contain quantities of gas which must be vented to atmosphere through the control mechanism and the bleeder valve. This gas, when boiling through petroleum liquid creates foam, which if vented with the gas is wasteful and if carried through the gathering system seriously interferes with flow of the liquid through the pipe line.

Therefore the principal object is to provide apparatus by which petroleum liquids may be more efficiently conducted through the gathering lines to the pumps by eliminating the surge effect near the pump inlets, venting the gas, liquefying the foam and automatically closing off each storage tank when the liquid level drops to a point where air may be drawn into the gathering lines.

Another object of the invention is to bleed the air and gas from the control valve while trapping and liquefying the foam for return with the flow to the gathering lines.

A further object of the invention is to prevent any discharge of the foam or mist with the gas.

Other objects of the invention are to provide a simple and inexpensive mechanism that is reliable in operation and which effectively separates and discharges the gas in dry form free from entrained liquid and foam, which is subsequently liquefied.

In accomplishing these other objects of the invention as herein pointed out, I have provided improved structure the preferred forms of which are illustrated in the accompanying drawings wherein:

Fig. 1 is a diagrammatic view of a battery of storage or gauge tanks connected with gathering lines equipped in accordance with the present invention.

Fig. 2 is an enlarged section of the upper portion of the gas bleeder, foam trap and surge dampener which is connected near the inlet to the pumps.

Fig. 3 is a section through the lower portion thereof.

Fig. 4 is a vertical section through one of the automatic control and stop valve mechanism equipped with a gas bleeder, surge dampener, foam trap and foam liquefier embodying the features of the present invention.

Fig. 5 is an enlarged section of the foam trap, surge dampener and bleeder showing the bleeder valve in section and the bleeder float in elevation.

Fig. 6 is a cross-section on the line 6—6 of Fig. 5 particularly illustrating the gas discharge ports to the bleeder valve.

Fig. 7 is a modified form of the invention and embodying a longer and more tortuous passageway for discharge of the gas and to assure settling out of the liquid and liquefaction of the foam.

Fig. 8 is an enlarged fragmentary section of the modified form of the invention.

Fig. 9 is a cross-section on the line 9—9 of Fig. 8.

Fig. 10 is a fragmentary view of the lateral terminal of the shank for lifting the check valve of the control apparatus shown in Figs. 4 and 7.

Referring more in detail to the drawings:

1 designates a battery of tanks connected by branch lines 2 through which liquid petroleum is caused to flow by gravity to gathering pipe lines 3 which conduct the liquid to the suction connection of pumps 4 by which the liquid is discharged under pressure to a main transportation pipe line 5 leading to a loading dock, other places of storage or to a distant market.

Interconnecting the lines 2 and 3 at each tank is a combination automatic shut-off and stop and check valve 6 equipped with a gas bleeder and foam trap and surge eliminating mechanism 7 embodying the features of the present invention. The valve 6 preferably includes a T-fitting 8 having a lateral connection 8a to connect with the line 2, and a lower connection 8b with an L-fitting 9 which in turn is connected with the inlet end of the pipes 3. Carried by the fitting 9 in coaxial alignment to the T-fitting is a ring 10 having a conical valve seat 11 circling an outlet 12 through which the liquid is passed through the pipes 2 to the pipes 3. The under side of the ring 10 also has a substantially flat seat 13 adapted to be engaged by a check valve 14 that operates within the L-fitting 9, as later described. Secured in the other or top connection 8c of the T-fitting 8 is an upwardly extending tube 15 which forms a vertically elongated float chamber 16 having its upper end closed by a transverse partition 17 of a coupling collar 18 which in turn carries the mechanism 7.

Extending upwardly with the T-fitting 8 are fingers 19 for guiding a float valve 20 to and from the bevelled seat 10. The float valve 20 forms the automatic shut-off valve and includes a hollow cylindrical body 21 adapted to float upon the liquid rising within the float chamber 16 so as to raise the float valve from its seat and permit flow of liquid through the port 11 into a pipe 3. Upon absence of liquid in the float chamber, as when the tank is empty, the float falls and is guided to the seat 11 by the fingers 19 to shut off the tank from its pipe 3 and prevent drawing of air into the line by way of the tank that might interfere with the operation of the pump.

Certain of the batteries in a gathering system might be located at higher levels and the check valve 14 is to float upon back-flow of liquid to prevent back-flow into the lines 2 of the lower batteries. Thus the check valve 14 is also of bouyant character and is slidably mounted on a finger or guide 22 that is carried by the bottom of the T-fitting 8 in coaxial alignment with the port 12. The check valve 14 has a valving face 23 at its upper end adapted to engage the seat 13 in order to prevent flow through the valve port 12. The seating end of the check valve 14 carries a sleeve 24 that sleeves over the finger 22 and which has its upper end closed as at 25 over the end of the finger 22. The opposite end of the sleeve 24 is open as indicated at 26 to pass the finger 22.

Each of the stop and check valves 56 is also a combination valve in that it serves as a manually operable stop valve which may be actuated by a lifting mechanism 27 including a shank portion 28 reciprocable through a stuffing box 29 that is carried by a tubular housing 30 threaded into a boss 31 on the lateral branch of the L-fitting as best shown in Fig. 7. The shank portion 28 extends downwardly through a passageway 32 of the boss 31 into the L-fitting and has a lateral terminal 33. The lateral portion has a ring portion 23' encircling the finger 22. The upper end of the shank projects from the stuffing box and carries a T-shaped handle 34 by which the shank is raised to lift the check valve 14 in engagement with the seating face 13 to stop flow through the port 12 in either direction.

If the float valve 20 is seated and it is desired to unseat the valve, as for example, when starting the flow with the valve 14 in open position and the float valve 21 in closed position, the handle 34 may be lifted so that manual lifting of the valve 14 projects the sleeve 24 through the port 12 and lifts the float valve so that it bobs upwardly by the buoyancy in the float chamber and allows the shut-off liquid to flow from the pipe 2 to the pipe 3.

Upward movement of the valve 20 is checked by a coil spring 35 that is suspended from the partition 17 by means of a rod 36. The valve mechanism just described is substantially the same as the valve mechanism disclosed in Patent No. 2,666,445, issued to me on January 19, 1954.

As above stated, the flowing liquid contains considerable quantities of entrained gas and tends to foam considerably while rising through the column of fluid in chamber 16 and in order to relieve the entrained gas and provide a trap for the foam that is pushed upwardly in the float chamber, I provide the combination bleeder and foam trap 7 as now to be described.

The mechanism 7 includes a tube 37 that is threaded into the collar 18 and forms a coaxial continuation of the tube 15 which forms the float chamber. The tube 37 is of sufficient length to provide a gas and foam separating chamber 38 that is separated from the float chamber 16 by the partition 17. The top of the separating chamber is closed by cap 39 that is threaded on the upper end of the tube 37 and carries a venting or bleeding mechanism 40 for venting the gas that separates within the chamber 38. The gas and foam when collected within the upper end of the float chamber is transferred to the separating chamber 38 through a pipe 41 that extends upwardly through the partition 17 and terminates near the upper end of the separating chamber in a downward curving outlet 42 that directs the gas and foam downwardly toward the bottom of the separating chamber and away from the inlet to the venting means 40 where the gas separates and escapes through the bleeder. The foam liquefies and collects in the lower end of the separating chamber 38 for return as a liquid to the float chamber through a duct 43 having an inlet end 44 threaded within an opening 45 in the partition 17 and having a lateral outlet 46 on the lower end to carry an outwardly opening check valve 47. With this arrangement the gas pressure within the float chamber closes the check 47 and confines the gas and foam for escape upwardly through the pipe 41 into the separating chamber wherein the foam liquefies and flows from the separating chamber through the duct 45 and into the float chamber upon lifting of the check where the liquid gravitates to the lower end of the float chamber and flows out with the liquid stream to the pipes 3.

The venting mechanism 40 is carried by a plug 48 that is carried within an axial opening 49 in the cap 39. Threaded in the opening 50 of the plug 48 is a nipple 51 carrying a ball check 52 that normally engages on a valve seat 53 of the nipple to close the outlet 54 therethrough and prevent the pump from drawing air into the separating chamber 38 and through the separating chamber to the pipes 3.

Connected with the nipple 51 by couplings 55 and 55' is an elbow 56 having a lateral nipple 57 which carries a downward opening elbow 58 through which the gas is discharged. Carried by the nipple 51 and extending downwardly from the plug 48 is a bleeder valve body 59 having an axial passageway 60 in connection with the axial passageway 61 of the nipple 51. Formed within the body 59 is downward facing conical seat 62 that is adapted to be engaged by a conical valve 63 on a rod 64. The rod 64 is slidably mounted in a bore 65 of a plug 66 that closes the lower end of the bleeder. Formed in the sides of the bleeder body and immediately below the valve seat is a plurality of inlet ports 67 for the gases that collect in the upper portion of the separating chamber.

If for some reason the liquid should tend to rise within the float chamber and pass through the duct 43, so as to flood the separating chamber, the valve 63 will be seated by means of a float 68 that is suspended from the rod 64, therefore, the bleeder outlet is closed to the flow of the liquid until the liquid level drops in the separating chamber to a point where the weight of the float opens the valve 63 and seats a shoulder 69 thereof against the face of the plug 66. It is obvious that when the liquid collects within the separating chamber 38 the check 47 opens and allows the liquid to flow out of the separating chamber into the float chamber.

The form of the invention illustrated in Fig. 7 is substantially the same as that illustrated in Fig. 4 with the addition of a mechanism for forming a longer and more tortuous passageway before the gas and foam can reach the inlets to the bleeder valve. In this instance, the tube 70, which corresponds to the tube 37, is of greater length so as to accommodate a substantially longer tube 71 that is threaded into the plug of the cap 39 and depends into the separating chamber to carry the bleeder valve at a substantial distance below the check ball 52. Carried by the bleeder valve body is a closed end of the outer tube 72. The outer tube 72 is of larger inner-diameter than the depending tube 71 to form a substantially longer down flow passageway 73 before the gas and any foam can reach the inlet ports 67 of the bleeder valve and even then the gas or foam must travel upwardly through the depending tube 71 so that the foam and liquid have ample opportunity of settling out and draining back into the separating chamber.

Assuming that the float valve is unseated and a considerable amount of foam is being carried with the liquid flow through the valve or is being formed in the float chamber, the foam rises in the float chamber and is forced through the tube 41 for discharge into the separating chamber 38 where any gas component of the foam separates and passes out through the port 67 and passageway 60. The foam, however, liquefies and the liquid drains to the bottom of the separating chamber for return to the float chamber by way of the return duct 43 and the check 47. In case an excess amount of liquid should accumulate in the separating chamber or should the liquid in the float chamber accumulate to a point where it passes through the tube 41 into the separating chamber, the liquid therein will contact the float 68 and cause the float to seat the valve 63 and thereby close the vent passageway so as to prevent loss of any liquid through the vent. After the liquid is drained off through the valve, the liquid in the separating chamber returns to the float chamber through the duct 43 for discharge along with the inflowing liquid.

The flow of liquid through the gathering lines 3 is by gravity aided by the suction of the pumps. With the pumps 4 in operation, the liquid is discharged under pressure to the main pipe line 5. The flow to the pumps is, therefore, under a static head and moves toward the pumps with substantial velocity. Therefore, when the inlet valves of the pumps close on each stroke there is a momentary blockage of the flow and the inertia of the flow against the block results in a back-surge through the gathering lines in opposition to the flow to the pumps. This surge effect builds up with each stroke of the pumps and reduces the efficiency. The mechanisms 7 therefore act as surge dampeners along with a main surge dampener and gas eliminator 75 connected into the gathering line near the inlet to the pumps for producing the major dampening effect on the back-surge near the place where the surge tends to start, as now to be described.

Connected into the portion of the line 3, near the inlets to the pumps, is a T-fitting 76 having a vertical branch 77 connected with a neck 78 of a surge chamber 79. The upper end 80 of the surge chamber terminates in a neck 81 to which is connected a liquid and air trap 82 similar in construction to the gas bleeder, foam trap and surge eliminating mechanism 7 previously described, and which is illustrated in Figs. 2 and 3.

The trap 82 includes a tubular casing 83 having a threaded lower end 84 that is connected through a coupling 85 with the neck 81 of the surge chamber 79. Inset within the lower end of the tubular casing 83 is a partition 86 which forms the bottom of a trap chamber 87, having its upper end closed by a cap 88 mounted on a threaded upper end 89 of the casing 83 as shown in Fig. 2. The cap 88 carries a bleeder or vent valve 90 having inlet ports 91 that connect the upper end of the chamber 87 and with an axial port 92. Outlet through the port 92 is controlled by a valve 93 similar to the valve 63 previously described. The valve 93 includes a head 94 having a stem 95 forming a shoulder 96 therewith to engage and be supported by a plug 97 when the valve 93 is in retracted position with respect to the seat 98 which encircles the inlet to the axial port 92. Fixed to the lower end of the stem 95 is a float 99 that is adapted to float on liquid 100 collecting in the chamber 87 to effect seating of the valve 93 and close discharge through the axial port 92 and check valve 101 to atmosphere through the vent pipe 102 which corresponds to the vent pipe of the first described form of the invention. The liquid flows to the chamber 87 through a tube 103 that extends through the partition 86 and has its upper end terminating near the top of the float 99 in a gooseneck outlet 104. The opposite end of the tube extends downwardly within the surge chamber 79 to form a seal with the liquid 105 present in the surge chamber as shown in Fig. 3 to trap air or gas in the upper end of the surge chamber to act as a cushion in dampening or dispersing the surges resulting from operation of the pumps.

In the absence of pressure in the surge chamber, the liquid trapped in the chamber 87 is returned to the surge chamber through a pipe or duct 106 that is connected with an outlet port 107 in the partition 86. The pipe 106 depends within the lower end of the tubular casing 83 and terminates in a lateral extension 108 carrying an outwardly opening check valve 109 which closes when pressure exists in the surge chamber 79 but opens on equalization of pressure in the chambers 79 and 87 to allow liquid to drain from the trap chamber 87 and venting of the trap chamber through the vent valve 91 when the level drops sufficiently for the float 99 to open the vent port.

In operation liquid rises in the surge chamber 79 until the level thereof reaches the inlet to the tube 103. Attention is here directed to the fact that the air or gas capacity of the surge chamber 79 is governed by the length of the tube 100, for example, if a larger capacity is required, the tube may be extended to near the lower end of the surge chamber and if less capacity is needed the tube may be shortened. On each pulsation or back-surge the liquid in the line rushes into the surge chamber 79 and compresses the air and/or gas trapped in the upper end thereof. Simultaneously with the inward flow of the liquid, a quantity of liquid is discharged through the tube 103 into the trap chamber 87 to provide the body of liquid 100 necessary in lifting the float 99 so that the valve 93 closes the vent port 92. When the vent port 92 is closed, any excess of liquid forced upwardly through the tube 103 into the trap chamber 87 effects discharge of a like amount of liquid through the check valve 109. It is thus obvious that the air and gas trapped in the surge chamber acts to dampen the pulsations or back-surges and the surge is substantially stopped thereby so as to not interfere with the flow of liquid through the gathering lines in the direction of the pumps. Should any surge get by, then the effect thereof is taken care of in a similar manner by the mechanisms 7.

When the flow of liquid stops in the gathering lines the inlet to the tube 103 is of course uncovered so that the pressure in the trap chamber 87 and surge chamber 79 equalize, whereupon the check valve 109 opens to allow the liquid in the trap chamber to drain therefrom into the surge chamber and through the surge chamber into the line. This allows the float 99 to drop and open the vents in the bleeder or vent valve. Therefore the vent remains open to allow venting of any air and gas from the gathering lines when another flow is established from one or more of the tanks. The air and gas in the gathering lines is pushed ahead of the oil and escapes into the surge chamber 79 and through the tube 103 into the trap chamber 87 from where it escapes through the vent. When the liquid reaches the surge chamber 79, it rises therein to establish a seal with the inlet end of the tube 103 whereupon a part of the air or gas is trapped in the surge chamber 79 for dampening the surging effect caused by momentary blocking of the flow on closure of the inlet valves of the pumps.

This surge cushion is replenished by subsequent air or gas in the petroleum fluid, thereby providing an automatically charged surge dampener.

If desired, additional devices 75 may be applied at high points in the flow line to discharge air or gas and prevent pockets or vapor locks that would interfere with flow of liquid to the pumps.

The form of the invention illustrated in Fig. 7 operates in the same manner as the mechanism of Figs. 4 to 6 except that any gas to be vented must travel downwardly through the passageway 73 and then upwardly through the tube 71 before it can escape through the vent. This assures ample time for any entrained foam or liquid to settle out and be returned to the separating chamber, otherwise the modified form of the invention operates in exactly the same manner as that illustrated in Figs. 4 to 6 inclusive.

From the foregoing it is obvious that I have provided a mechanism in combination with flow control devices that discharge air and gas from the lines ahead of the flow and when the lines are in operation eliminate any entrained gas that would ordinarily interfere with operation of the pressure pump in the gathering lines and when foam occurs along with the gas the foam is separated and trapped for return to the liquid component of the flow. Therefore only dry gas is discharged through the vent and there is no loss of liquid.

It is also obvious that while I have provided air and gas elimination from the gathering lines I have also provided for free flow of the liquid to the pumps without interference by back-surge or pulsations that ordinarily result during operation of the pumps.

It is also obvious that the invention provides a surge chamber to arrest pump surges as well as providing a surge free chamber where air and gas bleeder mechanism can be utilized, otherwise vent or bleeder float could not be used in a chamber where surge is present without loss of fluid through the bleeder.

What I claim and desire to secure by Letters Patent is:
1. In combination with a gathering pipe line for con- ducting liquids to a pump for discharging the liquids under pressure into a main flow pipe line, a control apparatus having a chamber for connection with the gathering line for receiving gas therein that is pushed ahead of the flow of liquid in the gathering line when flow is started to the pump, said apparatus including a foam trapping chamber having a gas vent in an upper portion thereof, a depending tube having an upper end connected with the vent, a valve on the lower end of the tube and having an inlet and an outlet, a valve controlling the outlet, an outer tube sleeved over the inner tube with the lower end connected with the valve and having an open upper end connected with the upper portion of the foam trapping chamber, a duct interconnecting the chambers and having an inlet portion in the first-named chamber to conduct gas and foam from said chamber and having an upper end discharging into the upper portion of the gas trapping chamber to discharge the gas and foam into said chamber from where the gas travels down the outer of said tubes into the inlet of said valve and upwardly through the inner tube to said vent, a float within the lower portion of the foam trapping chamber, a return duct connecting said chambers for returning liquid resulting from said foam trapping chamber to the first-named chamber to the gathering pipe line for permitting the float actuated valve to open the vent, and a check valve in the return duct for closing the return duct under pressure of the trapped gas.

2. In combination with a gathering pipe line for conducting liquids to a pump for discharging the liquids under pressure into a main flow pipe line, a control apparatus having a chamber for connection with the gathering line for receiving gas therein that is pushed ahead of the flow of liquid in the gathering line when flow is started to the pump, said apparatus including a foam trapping chamber having a gas vent in an upper portion thereof, a depending tube having an upper end connected with the vent, a valve casing on the lower end of the tube and having an inlet and an outlet, a valving element for controlling the outlet, an outer tube sleeved over the inner tube with the lower end connected with the valve casing and having an open upper end in connection with the upper portion of the foam trapping chamber, a duct interconnecting the chambers and having an inlet portion in the first-named chamber to conduct gas and foam from said chamber and having an upper end discharging into the upper portion of the gas trapping chamber to discharge the gas and foam into said chamber from where the gas travels down the outer of said tubes into the inlet of said valve and upwardly through the inner tube to said vent, a float within the lower portion of the foam trapping chamber, and having connection with the valving element, a return duct connecting said chambers for returning liquid resulting from said foam to the gathering pipe line for permitting the float actuated valve to open the vent, and a check valve in the return duct for preventing back flow through the return duct.

3. A flow control apparatus for a gathering pipe line which conducts liquid to a pump whereby the liquid is discharged under pressure into a main flow pipe line, said flow control apparatus having a gas collecting chamber for connection with the gathering pipe line and in which gas collects that is pushed ahead of the flow of liquid when the flow of liquid is started in the gathering line to the pump, said flow control apparatus also including a foam trapping and gas venting chamber separate from the gas collecting chamber and having a gas vent, a float controlled valve in the foam trapping and gas venting chamber for closing said vent upon accumulation of liquid in said foam trapping and venting chamber, a gas transferring duct having an inlet in connection with the lower portion of the gas collecting chamber and an outlet portion in connection with the foam trapping and gas venting chamber for passing gas from the collecting chamber to the foam trapping and gas venting chamber and to pass a relatively small stream of liquid to effect actuation of the float controlled valve for closing said vent to trap the gas in the gas collecting chamber when the flow of liquid in the gathering pipe line reaches said inlet portion of the transfer duct, and means for discharging the liquid from the foam trapping and gas venting chamber.

4. A flow control apparatus for a gathering pipe line which conducts liquid to a pump whereby the liquid is discharged under pressure into a main flow pipe line, a flow control apparatus having a gas collecting chamber for connection with the gathering pipe line and in which gas collects that is pushed ahead of the flow of liquid when the flow of liquid is started in the gathering line to the pump, said flow control apparatus also including a foam trapping and gas venting chamber separate from the gas collecting chamber and having a gas vent, a float controlled valve in the foam trapping and gas venting chamber for closing said vent upon accumulation of liquid in said foam trapping and gas venting chamber, a gas transferring duct having an inlet in connection with the lower portion of the gas collecting chamber and an outlet portion in connection with the foam trapping and gas venting chamber for passing gas from the collecting chamber to the foam trapping and gas venting chamber and to pass a relatively small stream of liquid to effect actuation of the float controlled valve for closing said vent to trap gas in the gas collecting chamber when the flow of liquid in the gathering pipe line reaches said inlet portion of the transfer duct, means forming a liquid return passageway to connect the foam trapping and gas venting chamber with the gas collecting chamber, and a check valve in said liquid return passageway to prevent flow of gas from the collecting chamber to the foam trapping and gas venting chamber by way of said return duct when the liquid from the gathering pipe line reaches said inlet portion of the transfer duct to render the gas in the collecting chamber effective in cushioning any surge in the flow of liquid to the pump.

5. A flow control apparatus for a gathering pipe line which conducts liquid to a pump whereby the liquid is discharged under pressure into a main flow pipe line, said flow control apparatus having a gas collecting chamber in connection with the gathering pipe line and in which gas collects that is pushed ahead of the flow of liquid when the flow of liquid is started in the gathering line to the pump, said flow control apparatus also including a foam trapping and gas venting chamber separate from the gas collecting chamber and having a gas vent in an upper portion thereof, a depending tube having an upper end connected with the gas vent, a valve casing on the lower end of the tube and having an inlet and an outlet, a valving element for controlling the outlet, an outer tube sleeved over the inner tube with the lower end connected with the valve casing and having an open upper end in connection with the upper portion of the foam trapping and gas venting chamber, a float for actuating the valving element to close said vent upon accumulation of liquid in said foam trapping and gas venting chamber, a gas transferring duct having an inlet in connection with the lower portion of the gas collecting chamber and an outlet portion in connection with the foam trapping and gas venting chamber for passing gas from the collecting chamber to the foam trapping and gas venting chamber and to pass a relatively small stream of liquid to actuate the float for closing said vent to trap gas in the gas collecting chamber when the flow of liquid in the gathering pipe lines reaches said inlet portion of the transfer duct, means forming a liquid return passageway to connect the foam trapping and gas venting chamber with the gas collecting chamber, and a check valve in said liquid return passageway to prevent flow of gas from the collecting chamber to the foam trapping and gas venting chamber by way of said return duct when the liquid from the gathering pipe line reaches said inlet portion of the transfer duct to render the gas in the collecting chamber effective in cushioning any surge in the flow of liquid to the pump.

References Cited in the file of this patent

UNITED STATES PATENTS

| | | |
|---|---|---|
| 1,086,215 | Porter | Feb. 3, 1914 |
| 2,396,653 | Hermanny | Mar. 19, 1946 |
| 2,582,105 | Cronkhite | Jan. 8, 1952 |
| 2,666,445 | Cronkhite | Jan. 19, 1954 |

FOREIGN PATENTS

| | | |
|---|---|---|
| 325,268 | Germany | Sept. 11, 1920 |